United States Patent [19]

Castellano

[11] Patent Number: 5,035,876

[45] Date of Patent: Jul. 30, 1991

[54] PROCESS FOR PREPARING A PRECURSOR OF ZIRCONIUM DIOXIDE

[75] Inventor: Maurizio Castellano, Turin, Italy

[73] Assignee: Eniricerche S.p.A., Milan, Italy

[21] Appl. No.: 421,133

[22] Filed: Oct. 13, 1989

[30] Foreign Application Priority Data

Oct. 19, 1988 [IT] Italy ............................... 22357 A/88

[51] Int. Cl.$^5$ ........................ B01J 13/00; C01G 25/02
[52] U.S. Cl. ..................................... 423/608; 252/309;
252/314; 252/315.01; 501/12
[58] Field of Search ................... 252/309, 314, 315.01;
423/608; 501/12

[56] References Cited

U.S. PATENT DOCUMENTS

| | | | |
|---|---|---|---|
| 1,590,067 | 6/1926 | Acheson | 252/314 X |
| 2,467,089 | 4/1949 | Marisic et al. | 252/315.01 X |
| 2,984,628 | 5/1961 | Alexander et al. | 252/314 X |
| 3,409,560 | 11/1968 | Faust et al. | 252/314 X |
| 4,397,666 | 8/1983 | Mishima et al. | 501/12 X |
| 4,595,512 | 6/1986 | Tellier et al. | 252/309 X |
| 4,654,048 | 3/1987 | Braun et al. | 501/103 X |
| 4,749,664 | 6/1988 | Ross et al. | 423/608 X |
| 4,808,397 | 2/1989 | Albizzati et al. | 423/608 |

FOREIGN PATENT DOCUMENTS 2226816 10/1987 Japan ................... 423/608

*Primary Examiner*—Richard D. Lovering
*Attorney, Agent, or Firm*—Hedman, Gibson, Costigan & Hoare

[57] ABSTRACT

A precursor of zirconium dioxide in form of submicronic particles is obtained by:

hydrolysing a zirconium alkoxide by bringing said zirconium alkoxide into contact with a microemulsion formed by an external oil phase, an internal aqueous phase, an emulsifier and a co-emulsifier;

discontinuing the reaction of hydrolysis in order to control the growth of the particles; and recovering the precursor of zirconium dioxide from the reaction mixture.

Such a precursor can be submitted to treatments of calcination in order to prepare zirconium dioxide for ceramic uses.

12 Claims, No Drawings

PROCESS FOR PREPARING A PRECURSOR OF ZIRCONIUM DIOXIDE

The present invention relates to a process for preparing a precursor of zirconium dioxide in submicronic particle form, suitable for being converted into zirconium dioxide for ceramic uses.

Zirconium dioxide is a material widely used in the art. For example, its catalytic characteristics in the processes of pyrolysis of hydrocarbons and in several organic reactions are known. Owing to its high melting temperature (of about 2,700° C.), zirconium dioxide has been used for a long time in the manufacture of ceramic and refractory materials. In particular, the glass industry makes large use of it, due to its good mechanical characteristics and its inertness towards concentrated acids and alkalies. With these characteristics, those combine, which relate to the high refractive index, to the low coefficient of thermal expansion and to the high electrical resistance of this product.

Zirconium dioxide has recently found a use in the manufacture of ceramic components for electronic uses, both in the sector of semiconductors, and in the sector of superconductors, for example in alloys with aluminum and yttrium oxides. In these uses, zirconium dioxide is required in the form of submicronic particles, which should be as uniform and regular as possible, for the purpose of obtaining a ceramic material homogeneous in all of its points, endowed with high mechanical characteristics, and capable of generating highly reliable end products for use in electronics.

Various processes have been proposed in the art, in order to obtain zirconium dioxide in submicronic form. Such processes are mainly based on the controlled hydrolysis of zirconium alkoxides.

In particular, the hydrolysis of zirconium alkoxides and the precipitation in alcoholic media is described by B. Fegley et al. in Bull. Am. Cer. Soc., 63, 374 (1983) and by H. K. Bowen et al., in Advances in Ceramics, Am. Cer. Soc. Press, Columbus (Ohio), 1984, Vol. 9, page 140.

The hydrolysis and precipitation from emulsion systems is described by A. Bagley in MIT Report No. 54, January 1985.

The processes based on the hydrolysis of zirconium alkoxides require a precise control of the kinetics of hydrolysis in order to obtain, in a reproducible way, particles of the desired size in the hydrolysate, and it was observed in practice that the correct control of the process of nucleation is difficult to be accomplished even when the process is carried out in a diluted system.

The purpose to the present invention is of overcome the above mentioned drawbacks which affect the prior art.

The present Applicant has found now, according to the present invention, that the kinetics of hydrolysis of zirconium alkoxides with water can be controlled in a safe and easy way, with a hydrolysate in submicronic particle form being obtained, when the hydrolysis water constitutes the internal phase of a microemulsion, i.e., a water-in-oil microemulsion.

By "water-in-oil microemulsion", a dispersion of colloidal type, transparent and thermodynamically stable is meant, which is constituted by an external oil phase, an internal aqueous phase, an emulsifier and a co-emulsifier, wherein the size of the particles of the internal phase is lower than one fourth of wave length of visible light.

In particular, the present Applicant found, according to the present invention, that the hydrolysis of zirconium alkoxides, in such a microemulsion, proceeds rapidly until particles of a precursor of zirconium dioxide are formed, which are of a size similar to the size of the dispersed phase, without any substantial further particle growth. In this way, controllably and reproducibly obtaining a precursor which can be transformed by calcination into ceramic-grade zirconium dioxide is possible. Furthermore, inasmuch as said microemulsion is stable also when it contains substantially large concentrations of the dispersed phase, said precursor can be produced with good productivity values.

In accordance therewith, the present invention relates to a process for preparing a precursor of zirconium dioxide in submicronic particle form by means of the hydrolysis with water of a zirconium alkoxide, said process being characterized in that:

zirconium alkoxide is hydrolysed by being brought into contact with a microemulsion formed by an external oil phase, an internal aqueous phase, an emulsifier and a co-emulsifier, with the size of the particles of the internal phase being comprised within the range of from 50 to 200 Å;

the reaction of hydrolysis is discontinued in order to control the growth of the particles; and the precursor of zirconium dioxide is recovered from the reaction mixture.

The hydrolysis can be carried out in a medium with a pH of from neutral to acidic value, and in particular, at pH values comprised within the range of from 7 to 1. It was found that an acidic medium can favour the homogeneousness of the particles of the hydrolysate, and the obtainment of particles having an even shape.

Zirconium alkoxides useful for the purposes of the present invention are those alkoxides which contain from 2 to 4 carbon atoms in the alkyl-oxy moiety of their molecule, such as, e.g., zirconium tetraethoxide, zirconium tetra-n-propoxide, zirconium tetra-n-butoxide and zirconium tetra-sec-butoxide.

The oil phase, which constitutes the external phase of the microemulsion, should necessarily be inert towards zirconium alkoxides, and water should be insoluble, or substantially insoluble, in said oil phase. In accordance therewith, aliphatic hydrocarbons and aromatic hydrocarbons liquid under room conditions are useful constituents of the oil phase. For the intended purpose, toluene, nonane, decane, undecane and relevant mixtures are preferably used.

The emulsifier used in the microemulsion according to the present invention is an oil-soluble surfactant of non-ionic or anionic type. In order to meet the requirements of oil-solubility, such a surfactant should have an HLB (hydrophile-lipophile balance) lower than 10.

The co-emulsifier used in the microemulsion according to the present invention is a liquid aliphatic alcohol containing from 4 to 6 carbon atoms in its molecule. Preferred co-emulsifier is butanol.

The above disclosed microemulsion is spontaneously formed by means of the simple mixing of the constituents thereof. One could proceed by dissolving the emulsifier in the oil and then adding the other two constituents to the solution. The so obtained microemulsion is transparent and thermodynamically stable. The particles of the internal phase show a maximal size of the order of 200 Å, and generally comprised within the range of from 50 to 200 Å.

The microemulsion maintains its characteristics of stability within a wide range of concentrations of its constituents. More particularly, the oil phase can be present in an amount comprised within the range of from 35 to 80% by weight, the aqueous phase within the range of from 0.5 to 10% by weight, the emulsifier within the range of from 1 to 20% by weight, and the co-emulsifier within the range of from 1 to 20% by weight.

According to a form of practical embodiment of the process of the present invention, the process is carried out in a neutral medium, and zirconium alkoxide is fed and brought into contact with the preformed microemulsion, by operating at room temperature (20°–25° C.), or at temperature values close to room temperature.

According to another form of practical embodiment, the hydrolysis is carried out under acidic pH conditions, using a mineral acid, such as, e.g., hydrochloric acid, as the hydrolysis catalyst and in this case, the preferred procedure consists in placing a first mixture containing a zirconium alkoxide, oil, emulsifier and co-emulsifier, into contact with a second mixture containing the aqueous solution of mineral acid, oil, emulsifier and co-emulsifier, still operating within the global composition limits as reported hereinabove.

In any case, water contained in the microemulsion shall be in an amount equal to, or slightly larger than (e.g., up to 20% larger) than the stoichiometrically amount required by the reaction of hydrolysis of zirconium alkoxide.

Under the above pointed out conditions, a fast hydrolysis of zirconium alkoxide is obtained at room temperature (20°–25° C.), within reaction times comprised within the range of from about 15 seconds to about 2 minutes, and generally of the order of from 1 to 2 minutes, with a suspension of solid particles of the precursor of Zirconium dioxide being formed.

The reaction is then discontinued by means of the addition of an aliphatic alcohol, e.g., butanol.

The solid particles are finally separated from the reaction medium, e.g., by centrifugation, and are washed. The precursor of Zirconium dioxide is thus obtained in the form of submicronic particles, with a cubic prismatic crystal habit. The size of these particles is smaller than 0.4 m, and is generally comprised within the range of from 0.2 to 0.3 m.

Such a precursor can be submitted to the usual treatments of calcination at high temperatures in order to remove the hydration water and any possible organic residues, and obtain a ceramic powder suitable for being processed in the sinterization processes.

The following experimental examples are given in order to better explain the invention.

EXAMPLE 1

A microemulsion is prepared, which has the following composition, as expressed as % by weight:

| | |
|---|---|
| toluene | 52.25% |
| n-butanol | 25.23% |
| sodium bis(2-ethylhexyl)sulfosuccinate | 21.02% |
| water | 1.50% |

In particular, in the preparation of said microemulsion, sodium bis(2-ethylhexyl)sulfosuccinate is first dissolved in toluene, and to the so obtained solution n-butanol and water are then added, with water being preliminarily bidistilled and filtered on 0.2 μm-Millipore filter. The operations of formation of the microemulsion are carried out at room temperature. The microemulsion is then filtered on an 0.45 μm-Teflon membrane, so as to remove any residual solid particles.

To 33.3 g of this microemulsion, 0.42 g of zirconium tetra-n-propoxide is added. Zirconium tetra-n-propoxide is added by means of a pipette with a Teflon tip kept dipped inside the microemulsion, while this latter is being kept stirred inside a cylindrical container under a nitrogen blanketing atmosphere. By operating at room temperature, the mass is kept stirred for a 2-minutes time. At the end of the reaction time, the hydrolysis is stopped by adding n-butanol in an amount of 10:1 by volume, relatively to the volume of the reaction mixture, and the solid is recovered by centrifugation and is washed with alcohol and water. At the analysis, the so obtained precursor of zirconium dioxide appears to be in the form of particles of size smaller than 1 μm.

EXAMPLE 2

The process is carried out in the same way as in Example 1, with a microemulsion being prepared, which has the following composition, as expressed as % by weight:

| | |
|---|---|
| toluene | 52.23% |
| n-butanol | 25.25% |
| sodium bis(2-ethylhexyl)sulfosuccinate | 21.02% |
| water | 1.50% |

To 33.3 g of this microemulsion, 0.21 g of zirconium tetra-n-propoxide is added. By proceeding in the same way as disclosed in Example 1, a precursor of zirconium dioxide is obtained in the form of particles of size smaller than 1 μm.

EXAMPLE 3

A mixture is prepared, which contains toluene (53% by weight), n-butanol (25.6% by weight), and sodium bis(2-ethylhexyl)sulfosuccinate (21.34% by weight).

This mixture is subdivided into two portions. To the first portion, zirconium tetraoxy-n-propoxide is added, and to the second portion 2 N aqueous hydrochloric acid is added. Said portions are combined, and the overall composition of the mixture, as % by weight, is as follows:

| | |
|---|---|
| toluene | 47.10% |
| n-butanol | 22.6% |
| sodium bis(2-ethylhexyl)sulfosuccinate | 18.9% |
| zirconium tetra-n-propoxide | 0.43%, and |
| 2N aqueous hydrochloric acid | 10.9% |

The hydrolysis is carried out in the same way as disclosed in the preceding examples. A precursor of zirconium dioxide is obtained, in the form of homogeneous particles of size smaller than 1 μm.

EXAMPLE 4

The process is carried out in the same way as in Example 3, with a composition being prepared, which contains, as expressed as % by weight:

| | |
|---|---|
| toluene | 46.0% |

-continued

| n-butanol | 22.2% |
| --- | --- |
| sodium bis(2-ethylhexyl)sulfosuccinate | 18.5% |
| zirconium tetra-n-propoxide | 2.2%, and |
| 2N aqueous hydrochloric acid | 11.1% |

The hydrolysis is carried out in the same way as disclosed in the preceding examples. A precursor of zirconium dioxide is obtained, in the form of homogeneous particles of size of the order of 1 μm.

What is claimed is:

1. A process for preparing a precursor of zirconium dioxide in submicronic particle form by hydrolyzing zirconium alkoxide with water, comprising:
   (a) contacting zirconium alkoxide with a microemulsion in a hydrolysis reaction to thereby hydrolyze said zirconium alkoxide, said microemulsion comprising an external oil phase; an internal aqueous phase wherein the size of particles of the aqueous phase are from 50 to 200 angstroms; an emulsifier; and a co-emulsifier;
   (b) discontinuing the hydrolysis reaction in order to control the particle growth; and
   (c) recovering the precursor of zirconium dioxide.

2. A process as defined in claim 1, wherein said hydrolysis reaction is performed in a medium having a pH of from 7 to 1.

3. A process as defined in claim 1, wherein said zirconium alkoxide has from 2 to 4 carbon atoms in the alkyloxy moiety of its molecule.

4. A process as defined in claim 3, wherein said zirconium alkoxide is selected from the group consisting of zirconium tetraethoxide, zirconium tetra-n-propoxide, zirconium tetra-n-butoxide and zirconium tetra-sec-butoxide.

5. A process as defined in claim 1, wherein said external oil phase of the microemulsion comprises a hydrocarbon selected from the group consisting of aliphatic hydrocarbons, aromatic hydrocarbons, and mixtures of the foregoing, and wherein said hydrocarbons are liquid at ambient conditions.

6. A process as defined in claim 5, wherein said hydrocarbons are selected from the group consisting of toluene, nonane, decane, undecane, and mixtures of the foregoing.

7. A process as defined in claim 1, wherein said emulsifier is selected from the group consisting of non-ionic oil-soluble surfactants, anoinic oil-soluble surfactants, and mixtures of the foregoing, wherein said surfactants have a hydrophile-lipophile balance of less than 10.

8. A process as defined in claim 1, wherein said co-emulsifier is a liquid aliphatic alcohol having from 4 to 6 carbon atoms.

9. A process as defined in claim 8, wherein said co-emulsifier is n-butanol.

10. A process as defined in claim 1, wherein said microemulsion comprises from about 35 to about 80 percent by weight oil phase; from 0.5 to 10 percent by weight aqueous phase; from 1 to 20 percent by weight emulsifier, and from 1 to 20 percent by weight co-emulsifier.

11. A process as defined in claim 1, wherein said hydrolysis is performed at room temperature for from 15 seconds to 2 minutes.

12. A process as defined in claim 11, wherein said hydrolysis is performed for from 1 minute to 2 minutes.

* * * * *